United States Patent [19]

Murthy

[11] 4,294,288

[45] Oct. 13, 1981

[54] ACCUMULATOR WITH FLOAT ORIENTING MEANS

[75] Inventor: Rajam R. Murthy, Houston, Tex.

[73] Assignee: Koomey, Inc., Houston, Tex.

[21] Appl. No.: 124,136

[22] Filed: Feb. 25, 1980

[51] Int. Cl.³ .............................................. F16L 55/04

[52] U.S. Cl. ....................................... 138/30; 137/192; 137/207; 137/397

[58] Field of Search ............................. 138/30, 26, 28; 137/192, 207, 397, 398, 399, 430, 433; 220/85 B

[56] References Cited

U.S. PATENT DOCUMENTS

| | | | |
|---|---|---|---|
| 902,355 | 10/1908 | Whittaker | 137/398 |
| 1,536,686 | 5/1925 | Mullen et al. | 137/192 |
| 2,580,637 | 1/1952 | Wright | 137/430 |
| 2,979,070 | 4/1961 | Payne | 138/30 |
| 3,095,005 | 6/1963 | Thompson | 137/430 |
| 3,581,763 | 6/1971 | Smith | 137/430 |

*Primary Examiner*—Willis Little

*Attorney, Agent, or Firm*—Pearne, Gordon, Sessions, McCoy & Granger

[57] ABSTRACT

A guided-float accumulator suitable for use with a hydraulic system for an oil well blowout preventer is provided with a vented float movable along a transversely centered, normally vertical guide rod according to the level of the liquid fill within the vessel. The vent outlet for the float and a ballast weight for the float are positioned on opposite sides of the guide rod and the float is mounted for free turning around the guide rod. Whatever the degree of liquid fill of the vessel, sidewise tilting of the vessel will be accompained by rotation of the vent outlet to the then-high side of the guide rod to maintain the float directly vented to the ullage space of the vessel.

5 Claims, 1 Drawing Figure

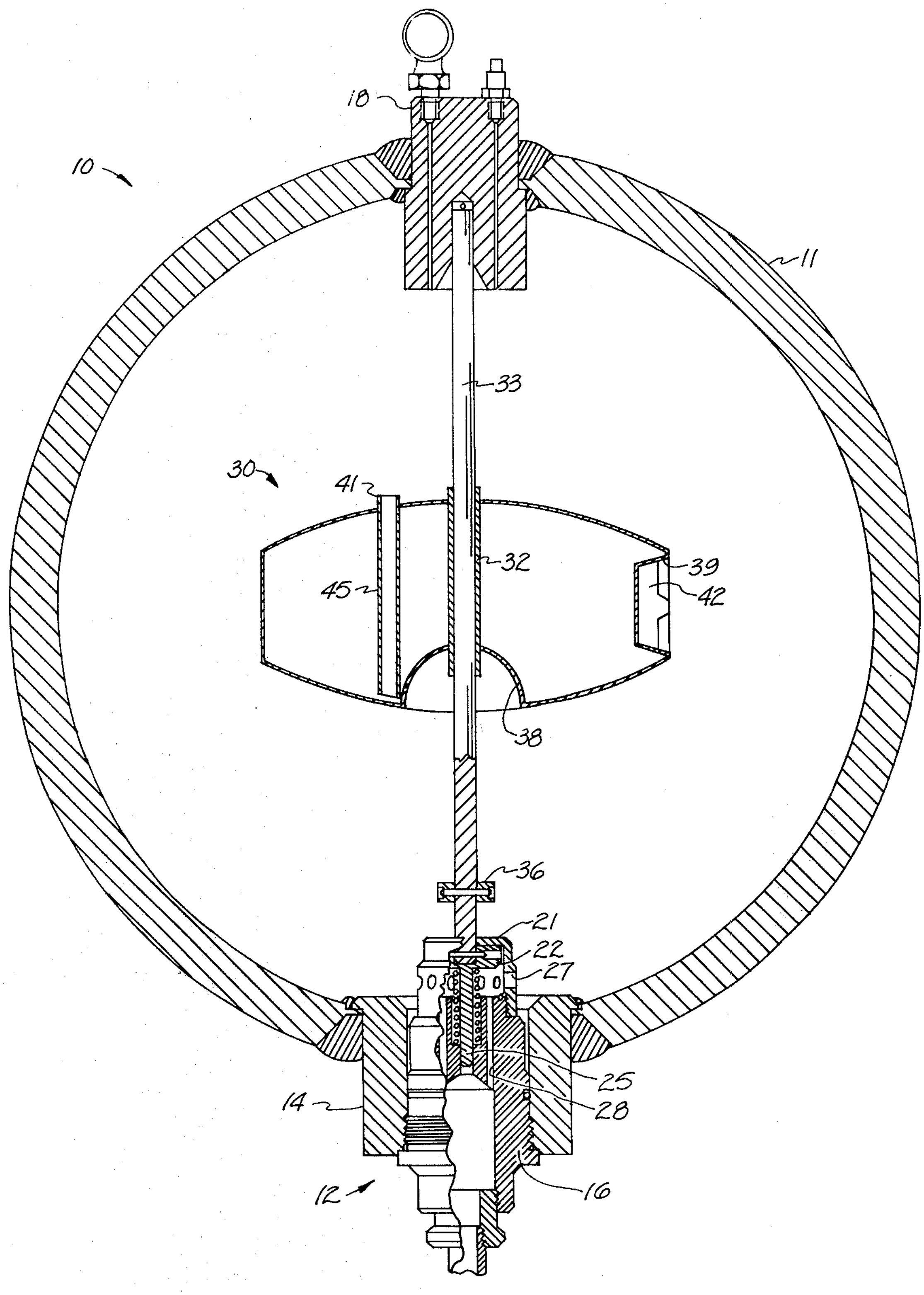
10
11
18
30
41
33
32
39
42
45
38
36
21
22
27
25
28
14
16
12

ACCUMULATOR WITH FLOAT ORIENTING MEANS

BACKGROUND OF THE INVENTION

This invention relates to accumulators for high pressure (say 3000 psi or higher) hydraulic systems such as used in oil well blowout preventer control systems. More particularly, the invention relates to accumulators of the type containing a guided hollow float movable in the accumulator vessel to close a shutoff valve at the bottom of the vessel to prevent the escape of pre-charged gas (usually nitrogen) from the vessel into the hydraulic system proper when the liquid level within the vessel becomes low.

Hollow floats used in accumulators must be vented directly to the ullage space in the accumulator vessel in order to prevent crushing when high fluid pressures are applied inside the vessel. Care must be taken to maintain the vessel in approximately an upright position to assure that the float continues to be vented directly to the ullage space and the vent outlet does not become submerged in the fill to cause flooding of the float. In the field, there is always a risk that the vessel will be inadvertently moved about or placed in a sidewise position during transport, storage or repair, causing submersion of the vent outlet and flooding of the float and, consequently, improper operation of the shut-off valve in subsequent operation of the accumulator after it is reinstated in service.

The present invention overcomes this problem by providing both a vent outlet for the float and a ballast weight for the float with the vent outlet and ballast weight on opposite sides of the center of the normally vertically extending guide means for the float, the float being mounted for free turning around such center. The result is that whatever the degree of liquid fill of the vessel, tilting of the vessel will be accompanied by turning or twisting of the float around the center of the guide means in such a manner as to keep the vent outlet above the level of the fill so that the float continues to be vented directly to the ullage space. Under normal operation of the accumulator with the vessel upright, the ballast weight is inoperative in respect of orientation of the float in any particular rotative position but, upon tilting of the vessel, the ballast weight comes into play to cause the float to turn or twist around the center of the guide means in the manner described.

BRIEF DESCRIPTION OF THE DRAWING

The FIGURE is a vertical sectional view of an accumulator exemplifying the invention.

DETAILED DESCRIPTION OF THE INVENTION

Shown in the drawing is an accumulator 10 comprising a spherical vessel 11 having a port or mouth 12 defined by a neck 14. This mouth is closed by a plug body 16. The neck 14 is welded to the wall of the spherical vessel as shown, and the plug body 16 is threadedly engaged in the neck 14. A suitable O-ring seal is provided between the plug body and neck, as shown.

Fluid outlet means and a shut-off valve are associated with the plug body 16. The housing 21 for the shut-off valve is threadably engaged on the plug body 16, and the valve 22 is adapted to close against a valve seat formed at the inner or top end of the plug body 16 to provide a pressure-tight seal in the closed position of the valve 22. The valve stem 25 is slidingly received in the plug body 16 and is surrounded by a valve spring, as shown. The spring biases the valve member 22 to its raised open position as shown. Fluid outlet means associated with the lower plug body 16 includes the outlet ports 27 formed in the valve housing 21, the longitudinal passages 28 formed in the plug body 16, and appropriate hydraulic connections and tubing associated with the lower end of the plug body 16 as shown.

A float 30 is mounted on a normally vertically extending guide rod 33 by a sleeve 32. A collar 36 is pinned to the guide rod in the manner shown. Within the housing 21, the guide rod 33 and valve member 22 are pinned together as shown, so that they move vertically as a unitary assembly. In the operation of the accumulator, as the level of the hydraulic fluid (not shown) falls, the float 30 moves down on the guide rod 33. As the vessel continues to empty, the bottom end of the sleeve 32 engages the collar 36 and the guide rod 33 and valve member 22 begin to move downwardly under the weight of the float 30 and against the bias of the valve spring. As the float 30 comes adjacent the bottom of the vessel, the valve 22 reaches fully closed condition and seats, preventing further emptying of the vessel. A recess 38 formed in the bottom of the float accommodates the top of the valve housing 21, allowing the float 30 to closely approach the bottom of the vessel 10 before full closure. The top end of the guide rod 33 may be slidingly supported by a boss 18 at the top of the vessel 11, and the boss 18 may include pressure gauge and bleed lines, as shown.

Upon resurgence of hydraulic pressure in the system to which the accumulator is connected, the weight of the float array is overcome and the valve reopens to allow hydraulic fluid to reenter the vessel chamber.

In order to prevent crushing of the float when the interior of the vessel 11 is pressurized, the float is provided with a vent outlet 41. The vent outlet 41 may open directly from the interior of the float or preferably, as shown, it may open from a vent line 45 whose bottom end in turn opens from the interior of the float at a low point.

According to the invention, the float 30 is centered on the normally vertically extending guide rod 33, and the float sleeve 32 allows the float to both slide along the guide rod and freely turn around the center of the guide rod. The vent outlet 41 is laterally spaced from one side of the center of the guide rod, and a ballast weight 42 is laterally spaced from the opposite side of such center. The ballast weight 42 may be a lead or steel plug or shape which is adhered or welded or otherwise fastened within a suitable lateral recess 39 formed in the float 30.

As the float 30 moves up and down on the rod 33 when the level of hydraulic fluid (not shown) rises and falls, the float remains at all times free to rotate. Therefore, no matter what the degree of fill, and no matter what the corresponding position of the float along the rod 33, any tilting of the accumulator toward the horizontal position during transport, storage, or repair will be accompanied by rotation of the vent outlet 41 to the then-high side of the rod 33. In some instances, tilting may also cause the float 30 to move slightly along the rod 33 because of changes in displacement caused by the tilting, so that the movement of the vent outlet 41 will be along a twisting or helical path rather than a simple circular path. In all instances, however, the vent outlet 41 will automatically move to the position which best avoids submersion so that the float continues to be vented directly to the ullage space above the hydraulic fluid (not shown).

It is to be noted, as previously mentioned, that under normal operation of the accumulator the ballast weight 42 is inoperative in respect of orientation of the float in any particular rotative position. Upon tilting of the vessel 11, the ballast weight comes into play to cause turning or twisting of the float and positioning of the vent outlet 41 in the manner described.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. In a guided-float accumulator comprising a vessel in the shape of a sphere or cylinder adapted to contain high fluid pressures, a mouth at the bottom of the vessel, fluid outlet means associated with the mouth for connection of the vessel and its content to a hydraulic system such as used in an oil well blowout preventer, a normally open shut-off valve associated with the mouth in series with the fluid outlet means, and a vented float movable in the vessel along transversely centered normally vertically extending guide means according to the level of the liquid fill within the vessel to thereby close off the shut-off valve and prevent the escape of pressurized gas from the ullage space of the vessel into the hydraulic system proper as the liquid fill within the vessel approaches exhaustion, the improvement which comprises provision of a vent outlet for the float and a ballast weight for the float with the vent outlet and ballast weight on opposite sides of the center of said normally vertically extending guide means, said float being mounted for free turning around said center whereby whatever the degree of liquid fill of the vessel, sidewise tilting of the vessel so as to move the normally vertically extending guide means toward a horizontal position will be accompanied by rotation of the vent outlet to the then-high side of said center of said normally vertically extending guide means to keep the vent outlet above the liquid fill and maintain the float directly vented to the ullage space of the vessel.

2. Apparatus as defined in claim 1, the normally vertically extending guide means comprising a guide rod extending coaxially with the imaginary vertical axis of the upright vessel, the float being in sliding engagement with the guide rod, the float being centered on the guide rod with the vent outlet and ballast weight on opposite sides of the guide rod.

3. A guided-float accumulator comprising a spherical or cylindrical vessel adapted to contain high fluid pressures, a mouth at the bottom of the vessel, fluid outlet means associated with the mouth for connection of the vessel and its contents to a hydraulic system such as used in an oil well blowout preventer, a normally open shut-off valve associated with the mouth in series with the fluid outlet, and a vented float movable in the vessel along transversely centered normally vertically extending guide means according to the liquid level within the vessel to thereby close off the shut-off valve and prevent the escape of pressurized gas from the ullage space by the vessel into the hydraulic system proper as the liquid fill within the vessel approaches exhaustion, a vent outlet for the float and a ballast weight for the float, the vent outlet for the float and the ballast weight for the float each being spaced laterally from the center of said normally vertically extending guide means but said vent outlet and ballast weight being spaced in opposite lateral directions from said center, said guided float being mounted for free turning around said center.

4. Apparatus as in claim 3, said guide means comprising a guide rod extending coaxially with the imaginary vertial axis of the upright vessel, the float being in sliding engagement with the guide rod, the float being centered on the guide rod with the vent outlet and ballast weight being laterally spaced from opposite sides of the guide rod.

5. Apparatus as in claim 4, the ballast weight being located at a lateral extremity of the float.

* * * * *